United States Patent
Yap et al.

(10) Patent No.: US 6,628,849 B2
(45) Date of Patent: Sep. 30, 2003

(54) PHOTONIC ENCODING SAMPLER

(75) Inventors: Daniel Yap, Thousand Oaks, CA (US); Willie W. Ng, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 147 days.

(21) Appl. No.: 09/848,498

(22) Filed: May 3, 2001

(65) Prior Publication Data

US 2003/0021509 A1 Jan. 30, 2003

(51) Int. Cl.$^7$ ............................................... G02F 1/035
(52) U.S. Cl. ................................ 385/3; 385/45; 385/27
(58) Field of Search ............................. 385/1–4, 8, 14, 385/15, 27, 31, 40, 41, 42, 45; 356/450, 477; 359/279, 245, 322, 237, 276; 250/214.1; 343/786, 772

(56) References Cited

U.S. PATENT DOCUMENTS

| | | | |
|---|---|---|---|
| 5,010,346 A | | 4/1991 | Hamilton et al. ............. 341/137 |
| 5,111,517 A | | 5/1992 | Riviere ......................... 385/11 |
| 5,196,852 A | | 3/1993 | Galton ......................... 341/143 |
| 5,249,243 A | * | 9/1993 | Skeie ............................. 385/3 |
| 5,253,309 A | | 10/1993 | Nazarathy et al. ............. 385/4 |
| 5,955,875 A | * | 9/1999 | Twichell et al. ............... 324/96 |
| 6,002,816 A | * | 12/1999 | Penninckx et al. ............ 385/3 |
| 6,326,910 B1 | | 12/2001 | Hayduk et al. .............. 341/137 |
| 6,422,985 B1 | | 7/2002 | Heitmann ..................... 492/16 |

FOREIGN PATENT DOCUMENTS

| EP | 0 403 991 | 12/1990 |
|---|---|---|
| EP | 0 484 791 | 5/1992 |

OTHER PUBLICATIONS

Pace, Phillip E. and Powers, John P., *Photonic Sampling of RF and Microwave Signals*, U.S. Naval Postgraduate School (1998).

Jensen, J.F., et al., "A 3.2–GHz Second–Order Delta–Sigma Modulator Implemented in InP HBT Technology," *IEEE Journal of Solid–State Circuits*, vol. 30, No. 10, pp. 1119–1127 (1995).

Galton, Ian and Jensen, Henrik T., "Delta–Sigma Modulator Based A/D Conversion without Oversampling," *IEEE Trans. on Circuits and Systems II: Analog and Digital Signal Processing*, vol. 42, No. 12, pp. 773–784, (1995).

Bridges, William B. and Schaffner, James H., "Distortion in Linearized Electrooptic Modulators," *IEEE Trans. on Microwave Theory and Techniques*, vol. 43, No. 9, pp. 2184–2197 (1995).

(List continued on next page.)

*Primary Examiner*—David V. Bruce
*Assistant Examiner*—Therese Barber
(74) *Attorney, Agent, or Firm*—Ladas & Parry

(57) ABSTRACT

An apparatus and method for photonically sampling an analog signal and encoding the photonically sampled signal. The two interferometer arms of a Mach-Zehnder interferometer section are directly coupled to the dual input ports of a directional coupler switch section. Optical pulses transmitted through the interferometer arms are phase shifted in proportion to an analog signal applied at the electrical input port of the Mach-Zehnder interferometer section. The phase-shifted pulses in each interferometer arm are coupled in the directional coupler switch section and are directed to the dual output ports of the directional switch section based upon the binary code applied to the electrical input port of the directional coupler switch section. The directional switch section has an optical length designed to provide a net phase shift of $3\pi/4$.

33 Claims, 3 Drawing Sheets

OTHER PUBLICATIONS

Korotky, Steven K. and Ridder, Rene M., "Dual Parallel Modulation Schemes for Low–Distortion Analog Optical Transmission," *IEEE Journal on Selected Areas in Communications*, vol. 8, No. 7, pp. 1377–1380 (1990).

Schiller, Chris and Byrne, Pat, "A 4–GHz 8–b ADC System," *IEEE Jornal of Solid–State Circuits*, vol. 26, No. 12, pp. 1781–1789 (1991).

Pace, Phillip E., et al., "Integrated Optical Sigma–Delta Modulators," *Optical Engineering*, vol. 35, No. 7, pp. 1828–1836 (1996).

* cited by examiner

PHOTONIC ENCODING SAMPLER

FIELD OF THE INVENTION

The present application relates to photonic sampling, and more specifically to an optical sampler that provides encoding capability.

BACKGROUND OF THE INVENTION

Analog-to-digital conversion is well known as a process in which a continuous analog signal, which theoretically has an infinite number of values or states, is converted to a digital signal, which has a finite number of values or states. Typically, in analog-to-digital conversion, the analog signal is first sampled. The sampled analog signal is represented as a series of pulses. Each pulse has a magnitude equal to the magnitude of the analog signal at a discrete moment in time. After sampling, the discrete time signal is then quantized by rounding the value of each pulse to the closest one of a finite number of values. The resulting signal is a digital version of the analog signal.

Sampling may be accomplished by electronic sampling techniques that are well known in the art. However, electronic sampling is limited by the speed at which the electronic circuitry can be clocked to sample the analog signal. Additionally, temporal jitter in the occurrence of the sampling clock may also limit the analog-to-digital conversion performance by causing non-uniform sampling, which will increase the quantization error.

Fortunately, sampling jitter limitations can be overcome by using photonic sampling. Photonic sampling makes use of ultra-short laser pulses with high temporal stability to sample an analog electrical input. Compared to electronic samplers, the photonic approach is capable of shorter sampling windows (sub-picosecond) and higher sampling rates, approaching 100 gigasamples per second (GSPS), and thus can sample wideband analog inputs.

One type of photonic sampler may be provided by a Mach-Zehnder interferometer. Mach-Zehnder interferometers are typically constructed within a slab of transparent material using processes similar to those used for constructing semiconductor devices. The waveguides used within a Mach-Zehnder interferometer are typically constructed from lithium niobate, due to its inherent electro-optically active characteristics.

A Mach-Zehnder interferometer 100 constructed within a slab 101 of electro-optically active material is shown in FIG. 1. As shown in FIG. 1, optical pulses 10 entering the device 100 are split through a "Y" splitter 111 into two directions and are directed into the two arms 121, 123 of the device 100. The optical pulses in each arm 121, 123 have one-half the power of the original pulses 10. An analog signal 20 is applied to a modulation input 170. The modulation input 170 is coupled to electrodes 131 that are placed adjacent to the upper arm 121 of the device 100. Application of the analog signal 20 to the modulation input 170 causes an electric field to be induced across the upper arm 121. The arms 121, 123 of the device 100 comprise material, such as lithium niobate, that changes its refractive index under the influence of an electric field. So when the analog signal 20 is applied, the refractive index of the material within the upper arm 121 will change and thus change the speed of propagation of the optical pulses in that arm 121. Hence, the phase of the optical pulses in the upper arm 121 will change in relation to the optical pulses in the lower arm 123.

If no electric signal is applied to the device 100, the optical pulses are recombined in phase at the "Y" junction 113. Since the signals in each arm 121, 123 are coherent with each other, they reinforce during the recombination, and optical pulses 30 at the original strength are output. If an electric signal is applied, there will be a phase difference between the pulses routed through the upper arm 121 and the pulses routed through the lower arm 123. When the optical pulses recombine, some or all of the optical power will be lost because the signals will interfere with each other. If the phase difference is a full 180 degrees, then the output will be zero. Hence, the pulse output 30 by the device 100 will have an optical power proportional to the analog signal 20 applied to the device 100. Thus, the optical output 30 will represent a sampled optical version of the analog input signal 20.

Another type of photonic sampler may be provided by a dual output Mach-Zehnder interferometer. As shown in FIG. 2, the dual output Mach-Zehnder interferometer 200 has a 3 dB directional coupler 213 at the point where the two interferometer arms 121, 123 recombine. If an input optical pulse undergoes the same phase shift in the two arms 121, 123, then an optical pulse is produced at both of the outputs 207, 209 of the device 200. This is because the optical pulse excites only the in-phase, that is, even, mode of the two waveguide guide coupler structure 213. If the optical pulse undergoes relative phase shifts of 180°, or $\pi$, again an optical pulse is produced at both of the outputs 207, 209 of the device 200. This is because only the odd mode of the two waveguide coupler structure 213 is excited. Although the amplitudes of the optical fields exiting the two coupler outputs are complementary, they have the same intensities. If the optical pulses undergo relative phase shifts of ±90°, or ±$\pi$/2, in the interferometer arms 121, 123, an optical pulse is produced at only one of the outputs 207, 209 of the device. This is because both the even and odd modes of the two-guide coupler 213 are now excited, with equal amplitudes. Whether the upper output 207 or lower output 209 of the device 200 transmits a pulse depends on whether the phase shift is +90° or −90°. If the optical pulses in the interferometer arms 121, 123 undergo intermediate amounts of relative phase shift, then some, unequal, amount of optical power is transmitted from both outputs of the coupler 207, 209.

A conventional dual output Mach-Zehnder interferometer 200 is usually operated such that an analog input voltage of 0 volts applied at the modulation input 170 results in the in-phase condition. An analog input voltage corresponding to ±$V_\pi$/2, which is somewhat higher than the full-scale ADC voltage, results in the ±90° phase shift condition. The length of the coupler is typically designed to achieve a net phase shift of $\pi$/2 or $\pi$ between the two coupler modes, depending on the construction of the coupler and how much mode conversion occurs at the input and output ends of the coupler. Thus, the dual output Mach-Zehnder interferometer provides a pair of optical signals which represent a sampled differential optical version of the analog input signal. The optical signal pair may be converted back to a single sampled signal by using a pair of photo detectors (not shown) coupled with a comparator (not shown).

A problem with the dual output Mach-Zehnder interferometer 200 depicted in FIG. 2 is fabricating the directional coupler section 213 such that the signals output from the two interferometer arms 121, 123 are properly coupled to produce a differential signal output. Careful manufacture of the lengths of the two waveguides in the directional coupler section will produce the desired coupling. Another method of obtaining the desired coupling is described by Nazarathy et al. in U.S. Pat. No. 5,253,309, issued Oct. 12, 1993, and shown in the Mach-Zehnder interferometer 700 FIG. 7.

Nazarathy et al. control electrodes 220 added to the Mach-Zehnder interferometer structure depicted in FIG. 2 to arrive at the structure depicted in FIG. 7. The control electrodes 220 adjust the splitting ratio between the signal output by the interferometer arms 121, 123. According to Nazarathy et al., an exemplary splitting ratio would be 50/50. If no phase shift is induced in the interferometer arms 121, 123 and the directional coupler section has a signal ratio of 50/50, equal intensity pulses will be produced at the outputs 207, 209, as described above. Generally, Nazarathy et al. disclose applying a constant DC voltage at the control input 770, so that the voltage applied at the control electrodes 220 is adjusted to ensure that the splitting ratio is correct for the wavelength of light transmitted within the interferometer 700.

Twichell et al. in U.S. Pat. No. 5,955,875, "Linearized Optical Modulator," issued Sep. 21, 1999, describe a photonic sampler that uses an interferometer to provide two modulated optical outputs. Twichell et al. disclose an interferometer configured to provide an electrical field across both arms of the interferometer to increase the phase shift provided within the interferometer. The outputs of the interferometer are coupled to photodetectors to convert the optical signals to electrical signals. Twichell et al. disclose the use of a signal processor to correct for any errors introduced in the sampling process. The signal processor may, therefore, correct for some of the signal errors described above.

A conventional dual-output Mach-Zehnder interferometer may be cascaded with a conventional directional coupler switch to apply a binary code to the sampled optical signal. FIG. 3 shows a directional coupler switch 300 constructed within the slab 101 of electro-optically active material. In a directional coupler switch 300, two waveguides 301, 303 are positioned adjacent each other in a coupling section 310 such that light from one waveguide 301, 303 can couple to the other waveguide 301, 303 within the coupling section 310. The length of the coupling section 310 will determine how much light will couple from one waveguide to the other. Electrodes 323 are positioned adjacent the waveguides 301, 303. A voltage is applied to the electrodes 323 from a control input 370. The coupling section 310 length may be chosen such that if no voltage is applied at the control input 370, the switch 300 is operated in its "bar" state, that is light entering the upper input port 305 will exit the upper output port 315 (and light entering the lower input port 307 will exit the lower output port 317). When sufficient voltage is applied at the control input 370, the switch is operated in the "cross" state, that is light entering the upper input port 305 will cross over and exit the lower output port 317 (and light entering the lower input port 307 will exit the upper output port 315).

For coding an optically sampled signal, the directional coupler switch 300 is used to switch signals between the upper output port 315 and the lower output port 317. For a differential signal, such switching serves to change the polarity of the signal. The directional coupler switch 300 typically operates in its bar state when zero voltage is applied such that the length of the coupling section is selected to achieve a net phase shift of $\pi$. In this state, a voltage can be applied to change the switch into its cross state where the net phase shift is now $\pi/2$. The binary code associated with the bar or cross state of the switch depends on the convention adopted in the design.

A typical binary code sequence may be a Hadamard sequence. A Hadamard sequence consists exclusively of plus and minus ones. Hence, the binary switching capability of the directional coupler switch described above provides the capability of multiplying a differential optical signal transmitted through the coupler by the plus and minus ones of a Hadamard sequence. However, other coding sequences known in the art may also be used to encode a pulsed optical signal transmitted through the coupler.

As shown in FIG. 4, the directional coupler switch 300 may be coupled to the output of the dual output Mach-Zehnder interferometer 200 to provide the capability to apply a code sequence to the optical pulses output by the interferometer. The dual output Mach-Zehnder interferometer 200 is coupled to a directional coupler switch 300 using a pair of optical waveguides 401. Sampled optical pulses are created by applying a stream of optical pulses to the input of the Mach-Zehnder interferometer 200 and applying an analog signal to the modulation input 170. Application of a sequence of code pulses to the control input 370 for the directional coupler switch 300 controls the switching of pulses between the output ports and thus provides the capability for encoding the sampled optical pulses sampled by the Mach-Zehnder interferometer 200.

It is evident to one skilled in the art that the cascaded two-device approach requires relatively long waveguides, since two directional coupler sections are needed, a first section for the interferometer to create the differential outputs and a second section to provide for encoding the differential outputs. The overall length of the coupler sections must be sufficient to produce at least a $3\pi/2$ relative phase shift between the two coupler modes. Furthermore, sections of separating and approaching waveguides must be included between the interferometer and switch. These sections also are long, to avoid the excessive scattering loss that would otherwise result from a more abruptly curving or bent waveguide.

These two devices 200, 300 could be fabricated on separate substrates and optically connected by means of optical fiber sections 401. Such a construct is functional, but cumbersome. Also, the lengths of the optical fiber sections for the dual outputs should be matched. Alternatively, the two devices could be fabricated on the same substrate. However, because of the limited size of common substrates, typically 3 inches for devices fabricated on lithium niobate, each device needs to be fairly short and, thus, requires higher modulation voltages.

Therefore, there exists a need in the art for a single device that provides both optical sampling and the capability to encode the sampled optical signal. Additionally, such a device should be capable of being fabricated on a single substrate and use relatively low modulation voltages.

SUMMARY OF THE INVENTION

An object of the present invention is to provide a method and apparatus for sampling analog signals with optical pulses and further encoding the optical samples. An additional object of the present invention is to provide such an encoding sampler on a single substrate.

A photonic encoding sampler according to the present invention is provided by coupling a dual output Mach-Zehnder interferometer with a dual input/dual output directional coupler switch. The dual input/dual output directional coupler switch takes the place of the 3 dB directional coupler used in a conventional dual output Mach-Zehnder interferometer. Since only one directional coupler is needed to implement the necessary sampling and encoding, the overall structure is shorter than that provided by the prior art. Construction of a Mach-Zehnder interferometer on a single substrate is well known in the art, so the present invention can be constructed on a single substrate since the directional coupler of the conventional Mach-Zehnder interferometer is merely replaced by a directional coupler switch.

The directional coupler switch may be controlled by a binary code signal, which allows the inputs to the switch to be either directed straight through the switch or to be crossed to opposite output ports. The Mach-Zehnder interferometer section of the present invention provides for converting the analog signal to a sequence of pairs of differential optical pulses. The directional coupler switch provides the capability for reversing the sign associated with a pair of differential optical pulses.

One code sequence particularly useful with the present invention is a Hadamard code sequence. Hadamard code sequences consist of a series of plus or minus ones. Therefore, using a Hadamard sequence to control the directional coupler switch, which controls the direction of outputs to the dual output ports of the switch, multiplies the optical samples by the plus and minus ones of Hadamard sequence.

A first embodiment of the present invention provides an photonic encoding sampler comprising an optical interferometer means for modulating an input optical signal with a first analog signal to produce a first optical interferometer signal and a second optical interferometer signal, the first optical interferometer signal shifted in phase from the second optical interferometer signal, the phase shift proportional to the magnitude of the first analog signal, and a directional coupler switch receiving the first optical interferometer signal and the second optical interferometer signal, the directional coupler switch switching the first optical interferometer signal and the second optical interferometer signal between a first directional coupler output and a second directional coupler output according to a second analog signal to produce a pair of differential optical output signals. The optical interferometer means preferably comprises a single input dual output Mach-Zehnder interferometer, but other interferometer means known in the art may be used, such as a Fabry-Perot interferometer or polarization interferometric modulator. The directional coupler switch may comprise an optical directional coupler, a fused taper coupler, twin code fiber couplers, planar waveguide couplers, or other such directional coupler switches known in the art.

Another embodiment of the present invention provides an encoding optical waveguide sampler, for sampling an analog signal and coding the analog signal with a code signal, comprising: a Mach-Zehnder interferometer section having a single optical input and two differential optical outputs, the Mach-Zehnder interferometer section controlled by the analog signal, and a directional coupler switch section having two optical inputs coupled to the two optical outputs of the Mach-Zehnder interferometer section and having two optical outputs, the directional coupler controlled by the code signal.

A further embodiment of the present invention provides a method for sampling an analog input signal and applying a code to the sampled analog signal, the method comprising the steps of: providing a stream of optical pulses having optical power; splitting said stream of optical pulses into two separate streams of optical pulses in two separate optical paths; phase shifting the two streams of optical pulses in relation to each other in proportion to the analog input signal; directing the two phase-shifted streams of optical pulses into a directional coupler switch having first and second optical input ports and first and second optical output ports, wherein one stream of optical pulses is directed into the first input port and the other stream is directed into the second input port; and controlling the directional coupler switch with the code so as to transfer a portion of the optical power of the optical pulses applied at the first optical input port to the first optical output port and the remaining portion of optical power to the second optical output port and to transfer a portion of the optical power of the optical pulses applied at the second optical input to the second optical port output and the remaining portion to the first optical output port. The outputs of the directional coupler switch comprise a differential optical signal representation of the encoded analog signal.

The present invention also provides the capability to apply two levels of modulation to an optical signal. The first level of modulation may comprise modulating a pulsed optical signal, as discussed above, and the second level of modulation may be used to further shape the modulated signal. Alternatively, both levels of modulation may be used to provide transfer function shaping for an optical signal transmitted through an apparatus according to the present invention, such that a more linearized modulation transfer function is achieved. Accordingly, a further embodiment of the present invention provides a method for modulating an optical signal with a first analog signal and a second analog signal, said method comprising the steps of: providing an optical signal having optical power; splitting said optical signal into two separate optical signals in two separate optical paths; phase shifting the two separate optical signals in relation to each other in proportion to the first analog signal; directing the two phase-shifted optical signals into a directional coupler switch having a first and second optical input and a first and second optical output, wherein one phase-shifted optical signal is directed into the first input and the other phase-shifted optical signal is directed into the second input port; controlling the directional coupler switch with the second analog so as to transfer a portion of the optical power of the optical signal applied at the first optical input to the first optical output and the remaining portion of optical power to the second optical output and to transfer a portion of the optical power of the optical signal applied at the second optical input to the second optical output and the remaining portion to the first optical output. The outputs of the directional coupler switch then comprise a differential optical signal that has been modulated by the first analog signal and the second analog signal.

DETAILED DESCRIPTION

Figure 5:
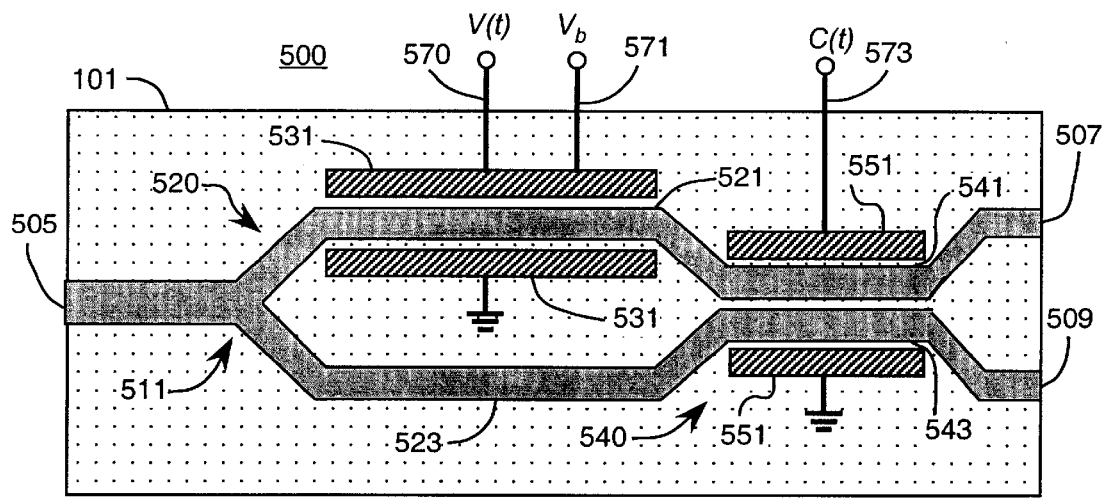
FIG. 5 illustrates a first embodiment of the encoding sampler in accordance with the present invention, wherein a single pair of electrodes is used to provide a phase shift within a Mach-Zehnder interferometer section.

An encoding sampler 500 according to the present invention that achieves both sampling and encoding is illustrated in FIG. 5. The encoding sampler may be constructed within a slab of electro-optical material 101 such as lithium niobate, gallium arsenide, or indium phosphide. The optical elements within the encoding sampler may be constructed using methods known in the art.

The encoding sampler 500 is not much longer than a standard dual-output Mach-Zehnder interferometer, therefore, the sampler 500 may be constructed on a single substrate. In this device 500, the optical input pulses are split equally by a "Y" coupler 511 between two arms 521, 523 of a Mach-Zehnder interferometer section 520. The analog input voltage V(t), via an analog modulation input 570, and a DC bias voltage $V_b$, via a DC bias input 571, are applied to an interferometer arm 521 and modulate the relative phase shifts of the optical pulses that propagate through the arms 521, 523, as in a conventional Mach-Zehnder interferometer. A pair of signal electrodes 531 is positioned adjacent one arm 521 of the Mach-Zehnder interferometer section 520 to provide phase shifting for the optical pulses within that arm 521. The arm 521 comprises electro-optically active material to allow an electric field applied by the electrodes 531 to change the refractive index within the arm 521. Similarly, interferometer arm 523 may comprise electro-optically active material and the signal electrodes 531 may be disposed adjacent that arm 523. The DC bias voltage $V_b$ may be applied by the signal electrodes 531 or a separate set of DC bias electrodes. The DC bias voltage $V_b$ may be used to correct for any path length differences between the interferometer arms 521, 523 by applying a constant electric field across one or both of the interferometer arms 521, 523. Other embodiments of an encoding sampler according to the present invention may eliminate the use of a DC bias voltage by tightly controlling the length of the interferometer arms or by biasing the analog input voltage V(t) applied at the analog modulation input 570.

The two interferometer arms 521, 523 are combined by a directional coupler switch section 540 to which a time-varying voltage C(t) is applied and a directional coupler switch section control input 573. The time-varying voltage C(t) can be selected so as to operate the directional coupler in either the "cross" state or "bar" state as previously described or in intermediate states, thus providing the capability to encode the optically sampled signal. The waveguides 541, 543 within the directional coupler switch section 540 are also constructed from electro-optically active material.

Preferably, the encoding sampler 500 is constructed on a single substrate, thus the longest dimension of the encoding sampler is limited by the size of the wafer on which the substrate is provided. Typically, the encoding sampler 500 has a length of less than 3 inches (7.6 cm). A device that is as long as can be fabricated on a single substrate is preferable, as this allows a longer interferometer section 520 and a longer directional coupler switch section 540 and thus reduces the drive voltages required to produce the desired sampling and encoding.

Figure 1:
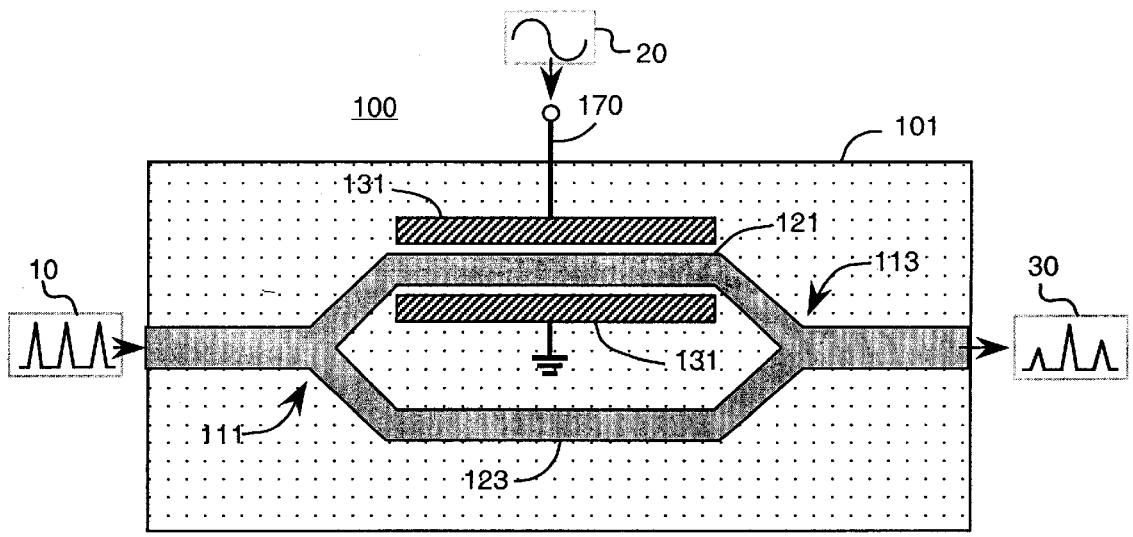
FIG. 1 (prior art) illustrates a single input, single output Mach-Zehnder interferometer used for photonically sampling an analog signal.
Figure 2:
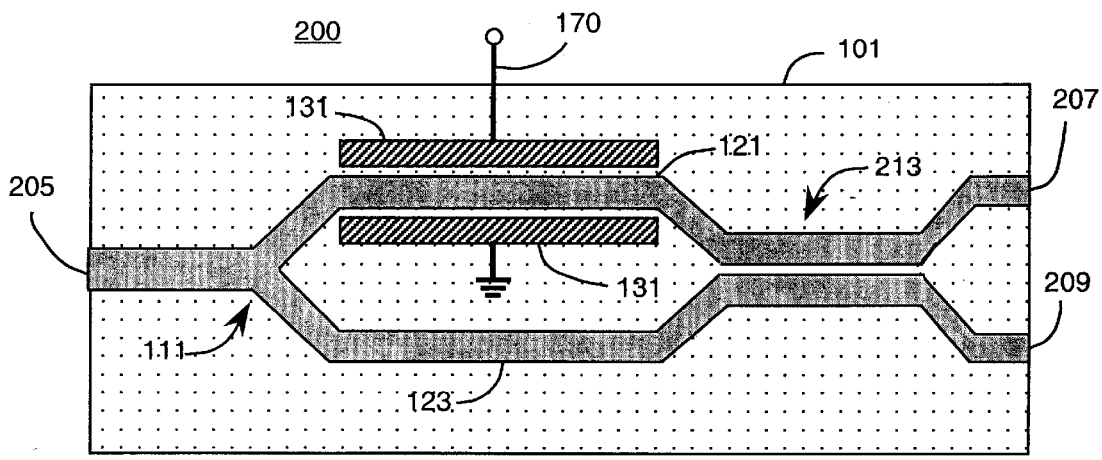
FIG. 2 (prior art) illustrates a single input, dual output Mach-Zehnder interferometer used for providing differential optical samples of an analog signal.
Figure 7:
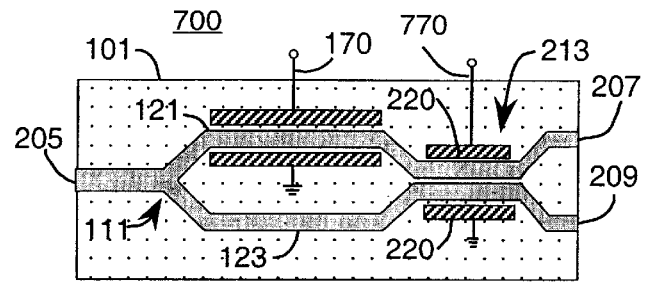
FIG. 7 (prior art) illustrates a single input, dual output Mach-Zehnder interferometer which uses control electrodes to create the desired splitting ratio between the outputs.
Figure 3:
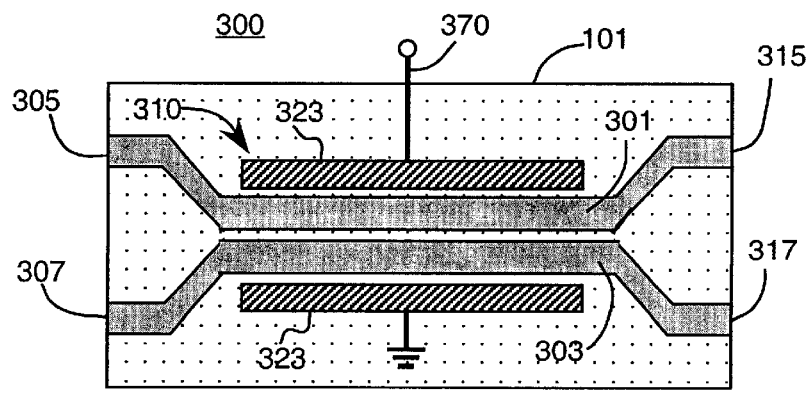
FIG. 3 (prior art) illustrates an optical directional coupler switch.

The encoding sampler 500, as described above and depicted in FIG. 5, is similar to the Mach-Zehnder interferometer 700 depicted in FIG. 7 and disclosed in U.S. Pat. No. 5,253,309. However, U.S. Pat. No. 5,253,309 discloses only that the control electrodes 220 adjacent the directional coupler section 213 are used to adjust the splitting ratio between the outputs. U.S. Pat. No. 5,253,309 does not disclose coupling the control electrodes 220 to a code signal for encoding an optical signal or to an analog signal for additionally modulating an optical signal. The embodiment of the present invention depicted in FIG. 5 uses the electrodes 551 adjacent the directional coupler section 540 to operate the directional coupler section 540 to encode the differential optical signal transmitted through the directional coupler section 540. Similarly, the embodiment of the present invention depicted in FIG. 6 (described in detail below) also uses the electrodes 551 adjacent the directional coupler section 540 to operate the directional coupler section 540 to encode the differential optical signal transmitted through the directional coupler section 540.

The directional coupler switch section 540 of the encoding sampler 500 has a length designed to achieve a net phase shift of $3\pi/4$ between the two modes of the combined interferometer output junction and the coupler switch. The additional phase shift of $\pi/4$ is included to account for the splitting of the optical power between the two modes of the directional coupler switch. This configuration results in one state of binary coding. In order to achieve the opposite state of the binary coding, a voltage can be applied to the directional coupler switch section 540 to change its state to achieve a net phase shift of $\pi/4$. When these two net phase shifts are generated in the directional coupler, the intended function of the interferometer is preserved. The directional coupler switch section has a transfer function matrix between its two input ports and its two output ports as shown below where $\psi$ is the phase shift provided by the switch:

$$\begin{bmatrix} \cos\psi & j\sin\psi \\ j\sin\psi & \cos\psi \end{bmatrix}$$

If the directional coupler switch section is set for a phase shift equal to $\pi/4$, then the transfer function matrix is:

$$\begin{bmatrix} 1 & j \\ j & 1 \end{bmatrix}$$

If the directional coupler switch section is set for a phase shift equal to $3\pi/4$ then the transfer function matrix is:

$$\begin{bmatrix} -1 & j \\ j & -1 \end{bmatrix}$$

The length of the coupler section required to achieve the desired phase shift depends on the characteristics of the electro-optic material, the voltage to be applied, and the wavelength of the light transmitted through the section. As indicated above, a longer coupler section is preferred, as this reduces the voltage required to achieve the desired phase shift. In a typical device, the coupler section will have a length of 5 mm to 5 cm, with applied voltages varying from several volts to several tens of volts. The Mach-Zehnder section of the present invention has similar lengths and applied voltages.

Figure 4:
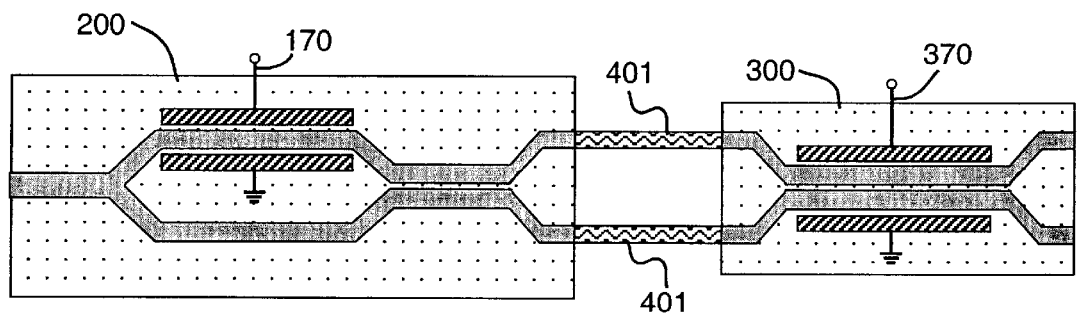
FIG. 4 (prior art) illustrates a Mach-Zehnder interferometer coupled to a directional coupler switch to provide sampling and encoding of an analog signal.

The results of a scattering matrix analysis of the conventional cascade of a Mach-Zehnder interferometer and a directional coupler switch described above and shown in FIG. 4 and the encoding sampler of the present invention are presented below.

The table below shows the power output at ports of conventional Mach-Zehnder interferometer coupled to conventional directional coupler switch, where $\phi$ is the phase shift provided by the Mach-Zehnder interferometer.

| Switch Function | Upper Output Port Power | Lower Output Port Power |
| --- | --- | --- |
| "Bar" state | 1/4 (1 − sinφ) | 1/4 (1 + sinφ) |
| "Cross" State | 1/4 (1 + sinφ) | 1/4 (1 − sinφ) |

The table below shows the power output at ports of the encoding sampler of the present invention, where φ is the phase shift provided by the Mach-Zehnder interferometer section and ψ is the phase shift provided by the directional coupler switch section.

| Switch Function | ψ | Upper Output Port Power | Lower Output Port Power |
| --- | --- | --- | --- |
| "Cross" state | π/4 | 1/4 (1 + sinφ) | 1/4 (1 − sinφ) |
| "Bar" state | 3π/4 | 1/4 (1 − sinφ) | 1/4 (1 + sinφ) |

The encoding sampler 500 may be constructed so that when the full-scale analog voltage is applied to the Mach-Zehnder interferometer section 520 of the sampler 500, the coupling length of the directional coupler section 540 is such that a sampled optical pulse is output to either the upper output port 507 or the lower output port 509. For example, when a code control signal equal to one state of the binary code is applied to the directional coupler section 540, the sampled optical pulse is output entirely to the upper output port 507. If a code signal equal to the other state of the binary code is applied to the directional coupler section 509, the sampled optical pulse is output entirely to the lower output port 509. When the analog input has a minimum value, the sampled optical pulse is output from both the upper and lower output ports 507, 509 with equal intensity, regardless of the code control state. Since the outputs from the upper and lower output ports 507, 509 provide a differential representation of the analog input signal, equal intensities at those ports represent a zero signal. Application of analog input voltages of intermediate values results in some splitting of the optical sampling pulse power between the two output ports 507, 509, in a manner similar to that for the convention dual-output Mach-Zehnder interferometer described above.

As indicated above, a Hadamard sequence of plus and minus ones may be used to provide the binary code to control the directional coupler switch. By controlling the switch with this type of code sequence, the optical samples are multiplied by these factors of plus one and minus one. However, other code sequences may be used, since the directional coupler switch provides the capability for switching based upon one binary state or another.

Alternative code sequences may include non-binary code sequences. Since the directional coupler switch section 540 has a transfer function dependent upon the phase shift provided at the directional coupler switch section 540, phase shifts between π/4 and 3π/4 may be used to provide additional levels of encoding to the sampled analog signal output by the sampler 500. Several discrete values for phase shifts between π/4 and 3π/4 may be used, or a continuous analog signal may be used to encode the differential signal output from the Mach-Zehnder interferometer section 520 of the sampler 500. In essence, the differential switch section control input 573 allows for the application of a second modulation signal to the optical signal transmitted through the encoding sampler 500.

The capability of the directional coupler switch section 540 to apply a second transfer function, dependent upon an applied electric signal C(t), to the differential output from the Mach-Zehnder section 520, provides the ability to shape the overall transfer function applied to the analog signal sampled by the sampler 500. Hence, the control voltage C(t), applied at the directional coupler switch section control input 573, provides the ability to apply a time-varying extra degree of freedom for the modulation provided by the Mach-Zehnder section 520 of the sampler. This extra degree of freedom may be used to linearize the overall modulation transfer function provided by the sampler 500, and allow that degree of freedom to be controlled in a time-varying fashion, as might be required in an adaptive optical signal transmission system.

Figure 6:
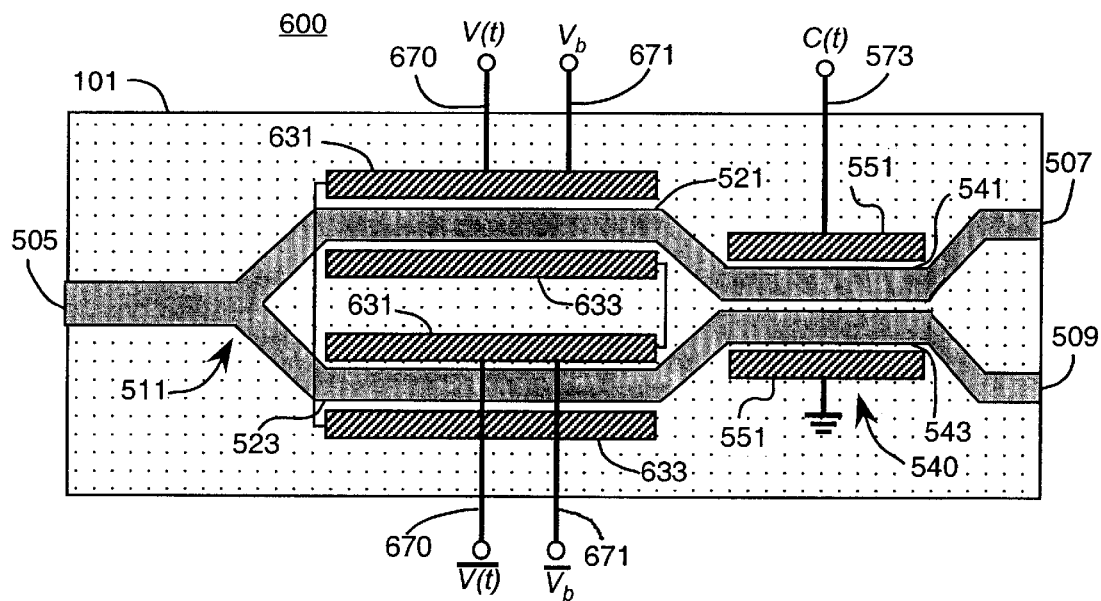
FIG. 6 illustrates a second embodiment of the encoding sampler in accordance with the present invention, wherein two pairs of electrodes are used to provide a phase shift within a Mach-Zehnder interferometer section.

An alternative embodiment of the present invention is shown in FIG. 6. In this embodiment, electrodes 631, 633 are positioned adjacent both arms 521, 523 of the Mach-Zehnder interferometer section 520. The electrodes 631, 633 are connected such that an electric field is applied across both arms, but the electric field across one arm is opposite in polarity to the electric field in the other. The polarity difference in the electric field may be provided by coupling a differential analog signal to the electrodes 631, 633, where one side of the differential analog signal represents the "true" analog signal, while the other side of the differential analog signal represents the complement of the analog signal. The electrodes 631, 633 can then be considered as "true" signal electrodes 631 and complementary signal electrodes 633. This configuration allows lower modulation voltages to be used to induce the necessary phase shift between the optical pulses in the upper arm 521 and the lower arm 523.

From the foregoing description, it will be apparent that the present invention has a number of advantages, some of which have been described above, and others of which are inherent in the embodiments of the invention described herein. Also, it will be understood that modifications can be made to the photonic encoding sampler and the method for sampling and encoding described above without departing from the teachings of subject matter described herein. As such, the invention is not to be limited to the described embodiments except as required by the appended claims.

What is claimed is:

1. An apparatus comprising:
    an optical interferometer means for modulating an input optical signal with a first analog signal to produce a first optical interferometer signal and a second optical interferometer signal, the first optical interferometer signal shifted in phase from the second optical interferometer signal, the phase shift proportional to the magnitude of the first analog signal, and
    a directional coupler switch receiving the first optical interferometer signal and the second optical interferometer signal, the directional coupler switch switching the first optical interferometer signal and the second optical interferometer signal between a first directional coupler output and a second directional coupler output according to a second analog signal to produce a pair of differential optical output signals,
    wherein said second analog signal is a code signal for encoding an optically sampled version of said first analog signal.

2. The apparatus according to claim 1 wherein said optical interferometer means comprises:
    a Y-fed optical splitter having an optical input port, a first optical splitter output port, and a second optical splitter output port, said optical splitter splitting the input optical signal applied to said optical input port into a first optical signal and a second optical signal;

a two-arm interferometer having a first input port connected to said first optical splitter output port, a first interferometer output port, a first interferometer arm connected between said first input port and said first interferometer output port, a second input port connected to said second optical splitter output port, a second interferometer output port, and a second interferometer arm connected between said second input port and said second interferometer output port;

a plurality of signal electrodes in proximity to said first interferometer arm or to said second interferometer arm or to said first interferometer arm and said second interferometer arm; and means for applying said first analog signal to said signal electrodes in order to create a phase shift between said first optical signal transmitted through said first interferometer arm and said second optical signal transmitted through said second interferometer arm to create the first optical interferometer signal and the second optical interferometer signal.

3. The apparatus according to claim 2 wherein said means for applying said first analog signal comprises:

a connection between said first analog signal and one or more signal electrodes of said plurality of signal electrodes, said one or more signal electrodes positioned on a first side of said first or second interferometer arm; and a connection between ground and one or more ground electrodes of said plurality of signal electrodes, said one or more ground electrodes positioned on a side opposite said first side of said first or second interferometer arm, such that application of said first analog signal to said one or more electrodes causes an electric field across said first or second interferometer arm.

4. The apparatus according to claim 2 wherein said means for applying said first analog signal comprises:

a connection between said first analog signal and two or more signal electrodes of said plurality of said signal electrodes, said two or more signal electrodes positioned on a first side of said first interferometer arm and a second side of said second interferometer arm; and a connection between ground and one or more ground electrodes of said plurality of signal electrodes, said one or more ground electrodes positioned on a side opposite said first side of said first interferometer arm and a side opposite said second side of second interferometer arm, such that application of said first analog signal to said two or more electrodes causes a first electric field across said first interferometer arm and a second electric field across said second interferometer arm, said second electric field having a polarity opposite to a polarity of said first electric field.

5. The apparatus according to claim 2 wherein said first analog signal is a differential signal provided by the difference between an analog true signal and an analog complementary signal and said means for applying said first analog signal comprises:

a connection between said analog true signal and two or more true signal electrodes of said plurality of said signal electrodes, said two or more true signal electrodes positioned on a first side of said first interferometer arm and a second side of said second interferometer arm; and a connection between said analog complementary signal and one or more complementary signal electrodes of said plurality of signal electrodes, said one or more complementary signal electrodes positioned on a side opposite said first side of said first interferometer arm and a side opposite said second side of second interferometer arm, such that application of said analog true signal to said two or more true signal electrodes and application of said analog complementary signal to said one or more complementary signal electrodes causes a first electric field across said first interferometer arm and a second electric field across said second interferometer arm, said second electric field having a polarity opposite to a polarity of said first electric field.

6. The apparatus according to claim 2 wherein said first analog signal is a differential signal provided by the difference between an analog true signal and an analog complementary signal and said means for applying said first analog signal comprises:

a connection between said analog true signal and one or more true signal electrodes of said plurality of said signal electrodes, said one or more true signal electrodes positioned on a first side of said first or second interferometer arm; and a connection between said analog complementary signal and one or more complementary signal electrodes of said plurality of signal electrodes, said one or more complementary signal electrodes positioned on a side opposite said first side of said first or second interferometer arm, such that application of said analog true signal to said one or more true signal electrodes and application of said analog complementary signal causes an electric field across said first or second interferometer arm.

7. The apparatus according to claim 2 further comprising a connection between a DC bias signal and said plurality of signal electrodes, wherein application of said DC bias signal causes a constant electric field across said first interferometer arm or said second interferometer arm.

8. The apparatus according to claim 2 further comprising a connection between a DC bias signal and said plurality of signal electrodes, wherein application of said DC bias signal causes a first constant electric field across said first interferometer arm and a second constant electric field across said second interferometer arm, said second constant electric field having a polarity opposite a polarity of said first electric field.

9. The apparatus according to claim 2 further comprising:

a plurality of DC bias electrodes disposed adjacent said first interferometer arm or said second interferometer arm; and a connection between a DC bias signal and said plurality of DC bias electrodes, wherein application of said DC bias signal causes a constant electric field across said first interferometer arm or second interferometer arm.

10. The apparatus according to claim 2 further comprising:

a plurality of DC bias electrodes disposed adjacent said first interferometer arm and said second interferometer arm; and a connection between a DC bias signal and said plurality of DC bias electrodes, wherein application of said DC bias signal causes a first constant electric field across said first interferometer arm and a second constant electric field across said second interferometer arm, said second constant electric field having a polarity opposite a polarity of said first electric field.

11. The apparatus according to claim 1 wherein said directional coupler switch comprises:
- a directional coupler having a first optical input port receiving the first optical interferometer signal and a second optical input port receiving the second optical interferometer signal, a first optical channel connected between said first optical input port and said first directional coupler output, and a second optical channel connected between said second optical input port and said second directional coupler output, wherein said first and said second optical channels are disposed adjacent to each other to allow transfer of optical power between said optical channels;
- a plurality of coupler electrodes in proximity to said optical channels; and
- means for applying said second analog signal to said coupler electrodes in order to control a transfer of optical power from said first optical channel to said second optical channel and from said second optical channel to said first optical channel.

12. The apparatus according to claim 11 wherein said means for applying said second analog signal comprises:
- a connection between said second analog signal and one or more signal electrodes of said plurality of said coupler electrodes, said one or more signal electrodes positioned on a first side of said first optical channel; and
- a connection between ground and one or more ground electrodes of said plurality of coupler electrodes, said one or more ground electrodes positioned on a side of said second optical channel opposite said first side of said first optical channel, such that application of said second analog signal to said one or more signal electrodes causes an electric field across said first and said second optical channels.

13. The apparatus according to claim 11 wherein said second analog signal is a differential signal provided by the difference between an analog true signal and an analog complementary signal and said means for applying said second analog signal comprises
- a connection between said analog true signal and one or more true signal electrodes of said plurality of said coupler electrodes, said one or more true signal electrodes positioned on a first side of said first optical channel; and
- a connection between said analog complementary signal and one or more complementary signal electrodes of said plurality of coupler electrodes, said one or more complementary signal electrodes positioned on a side of said second optical channel opposite said first side of said first optical channel, such that application of said second true analog signal to said one or more true signal electrodes and application of said complementary signal to said one or more complementary signal electrodes causes an electric field across said first and said second optical channels.

14. The apparatus according to claim 1 wherein said code signal is a binary code sequence.

15. The apparatus according to claim 14 wherein said binary code sequence is a Hadamard sequence.

16. An apparatus comprising:
- an optical interferometer means for modulating an input optical signal with a first analog signal to produce a first optical interferometer signal and a second optical interferometer signal, the first optical interferometer signal shifted in phase from the second optical interferometer signal, the phase shift proportional to the magnitude of the first analog signal, and
- a directional coupler switch receiving the first optical interferometer signal and the second optical interferometer signal, the directional coupler switch switching the first optical interferometer signal and the second optical interferometer signal between a first directional coupler output and a second directional coupler output according to a second analog signal to produce a pair of differential optical output signals,
wherein said apparatus is fabricated on a single substrate.

17. An encoding optical waveguide sampler, for sampling an analog signal and coding the analog signal with a code signal, comprising:
- a Mach-Zehnder interferometer section having a single optical input and two differential optical outputs, said Mach-Zehnder interferometer section controlled by the analog signal, and
- a directional coupler switch section having two optical inputs coupled to the two optical outputs of the Mach-Zehnder interferometer section and having two optical outputs, said directional coupler controlled by the code signal.

18. The encoding optical waveguide sampler according to claim 17 constructed on a single substrate.

19. The encoding optical waveguide sampler according to claim 17 wherein said code signal has a binary code sequence.

20. The encoding optical waveguide sampler according to claim 19 wherein said binary code sequence is a Hadamard sequence.

21. The encoding optical waveguide sampler according to claim 17 wherein said Mach Zehnder interferometer section comprises:
- a Y input coupler;
- two interferometer arms; and
- a pair of electrodes,
wherein the electrodes in the pair are positioned on either side of one of the two interferometer arms, the electrodes positioned to induce an electric field across said interferometer arm when said analog signal is applied to the electrodes.

22. The encoding optical waveguide sampler according to claim 21 further comprising a DC bias signal connected to said pair of electrodes, said DC bias signal inducing a constant electric field across said interferometer arm.

23. The encoding optical waveguide sampler according to claim 17 wherein said Mach Zehnder interferometer section comprises:
- a Y input coupler;
- two interferometer arms; and
- two pairs of electrodes,
wherein the electrodes in a first pair of electrodes are positioned on either side of one interferometer arm and the electrodes in the first pair induce a first electric field across the interferometer arm when said analog signal is applied and the electrodes in a second pair of electrodes are positioned on either side of the other interferometer arm, and the electrodes in the second pair induce a second electric field across the interferometer arm when said analog signal is applied, wherein said second electric field has a polarity opposite to a polarity of said first electric field.

24. The encoding optical waveguide sampler according to claim 23 further comprising a DC bias signal connected to said two pairs of electrodes, said DC bias signal inducing a first constant electric field across said first interferometer arm and a second constant electric field across said second interferometer arm, said second electric field having a polarity opposite to a polarity of said first electric field.

25. The encoding optical waveguide sampler according to claim 17 wherein said directional coupler section comprises:

a directional coupler having a first and a second optical input port, a first and second optical output port, a first optical channel connected between said first optical input port and said first optical output port, and a second optical channel connected between said second optical input port and said second optical output port, wherein said first and said second optical channel are positioned to allow transfer of optical power between said optical channels;

a first coupler electrode positioned on a first side of said first optical channel; and a second coupler electrode positioned on a second side of said second optical channel, said first coupler electrode and said second coupler electrode positioned to induce an electric field across said first and second optical channels when said code signal is applied to said electrodes.

26. The encoding optical sampler according to claim 17 wherein the directional coupler switch section has a length to provide a phase shift of $3\pi/4$ of an optical signal traveling between said coupler inputs and said coupler outputs.

27. A method for sampling an analog input signal and applying a code to the sampled analog signal comprising:

providing a stream of optical pulses having optical power;

splitting said stream of optical pulses into a first stream of optical pulses having optical power transmitted in a first optical path and a second stream of optical pulses having optical power transmitted in a second optical path;

phase shifting the first steam of optical pulses in relation to the second stream of optical pulses in proportion to the analog input signal;

directing the two streams of optical pulses into a directional coupler switch having first and second optical input ports and first and second optical output ports, wherein the first stream of optical pulses is directed into the first input port and the second stream of optical pulses is directed into the second input port; and controlling the directional coupler switch with the code so as to transfer a portion of the optical power of the first stream of optical pulses to the first optical output port and the remaining portion of optical power of the first stream of optical pulses to the second optical output port and to transfer a portion of the optical power of the second stream of optical pulses to the second optical output port and the remaining portion of the optical power of the second stream of optical pulses to the first optical output port.

28. The method according to claim 27 wherein said directional coupler switch has a cross state and a bar state and said code is a binary code and said step of controlling the directional coupler switch controls the switch in its cross state or bar state depending upon the value of the binary code.

29. The method according to claim 28 wherein said binary code comprises a Hadamard sequence.

30. The method according to claim 27 further comprising the step of applying a constant phase shift to one stream of optical pulses in relation to the other stream of optical pulses to compensate for phase differences caused by the first and second optical paths.

31. A method for modulating an input optical signal with a first analog signal and a second analog signal, said method comprising the steps of:

splitting said input optical signal into a first optical signal in a first optical path and a second optical signal in a second optical path;

phase shifting the first optical signal and the second optical signal with phase shifts in proportion to the first analog signal to create a first phase-shifted optical signal having optical power and a second phase-shifted optical signal having optical power;

directing the first phase-shifted optical signal and the second phase-shifted optical signal into a directional coupler switch having first and second optical inputs and first and second optical outputs, wherein the first phase-shifted optical signal is directed into the first input and the second phase-shifted optical signal is directed into the second input; and controlling the directional coupler switch with the second analog signal so as to transfer a portion of the optical power of the first phase-shifted optical signal to the first optical output and the remaining portion of optical power of the first phase shifted optical signal to the second optical output and to transfer a portion of the optical power of the second phase-shifted optical signal to the second optical output and the remaining portion of the optical power of the second phase-shifted optical signal to the first optical output.

32. The method according to claim 31 wherein the step of phase shifting the first and second optical signals is performed with a Mach-Zehnder interferometer.

33. The method according to claim 31 further comprising the step of applying a constant phase shift between the first optical signal and the second optical signal to compensate for phase differences caused by the first and second optical paths.

* * * * *